United States Patent [19]

Ikeda

[11] Patent Number: 4,562,821
[45] Date of Patent: Jan. 7, 1986

[54] SYSTEM FOR CONTROLLING THE AMOUNT OF RECIRCULATED EXHAUST GAS FOR A DIESEL ENGINE

[75] Inventor: Shinji Ikeda, Susono, Japan

[73] Assignee: Toyota Jidosha Kabushiki Kaisha, Toyota, Japan

[21] Appl. No.: 609,184

[22] Filed: May 11, 1984

[51] Int. Cl.[4] ............................................. F02M 25/06
[52] U.S. Cl. ....................................... 123/569; 123/571
[58] Field of Search ................. 123/568, 569, 570, 571

[56] References Cited

U.S. PATENT DOCUMENTS

| 4,333,438 | 6/1982 | Perez et al. | 123/569 |
| 4,381,748 | 5/1983 | Eckert et al. | 123/571 X |
| 4,388,909 | 6/1983 | Ogasawara et al. | 123/569 X |
| 4,433,667 | 2/1984 | Ripper | 123/571 X |
| 4,450,825 | 5/1984 | Sekiguchi et al. | 123/571 X |

FOREIGN PATENT DOCUMENTS

0151252  11/1981  Japan .................................. 123/569

Primary Examiner—Parshotam S. Lall
Assistant Examiner—W. R. Wolfe
Attorney, Agent, or Firm—Finnegan, Henderson, Farabow, Garrett & Dunner

[57] ABSTRACT

A method of controlling the exhaust gas recirculation for a Diesel engine by the adjustment of the sectional area of an exhaust passage connected between the exhaust and suction sides of the engine in accordance with the speed, and the engine load, which comprises the steps of detecting the burning flame light of fuel inside the cylinder, and increasing or decreasing the recirculation amount of the exhaust gas in accordance with the intensity of the light detected by a flame sensor and an apparatus for controlling the same by use of a microprocessor in accordance with signals detected a plurality of sensors including the flame sensor. According to the present invention, the exhaust gas recirculation amount can be accurately controlled in accordance with the change in the atmospheric pressure, or altitude where the engine is running.

5 Claims, 10 Drawing Figures

SYSTEM FOR CONTROLLING THE AMOUNT OF RECIRCULATED EXHAUST GAS FOR A DIESEL ENGINE

BACKGROUND OF THE INVENTION

1. Field of the Invention

The present invention relates to a method and an apparatus for controlling the recirculation of exhaust gas for a Diesel engine, more particularly to a method of controlling the recirculation of the exhaust gas in an environment where the atmospheric pressure will change along with the change in the engine's geographical height from the sea, i.e. altitude and an apparatus for controlling the same.

2. Description of the Prior Art

The recirculation of the exhaust gas to the cylinders of the Diesel engine is such that part of the exhaust gas is taken out from the exhaust system and controlled for temperature, timing or flow rate for recirculation to the suction system, and it is therefore effective in the reduction of NOx. However, if the exhaust gas is recirculated in a low-pressure environment such as mountainous regions in the same manner as land at low elevation, white smoke is produced during the engine operation with a constant load, and in particular, during the idling of the engine.

Heretofore, to overcome this drawback, it has been proposed to use an atmospheric pressure sensor in which the output is changed depending upon the atmospheric pressure, thereby setting amount or rate of the exhaust gas recirculation at a reduced value when the Diesel engine is being operated at a high elevation.

The atmospheric pressure sensor according to the prior art was, however, disadvantageous in that it had a relatively large volume and accordingly a large space was required since the atmospheric pressure was measured by determining a mechanical displacement of a diaphragm or the the like used in the measuring unit, said mechanical displacement being due to a difference in the atmospheric pressure between the inside and the outside of the measuring unit. Furthermore, this measuring unit was not always accurate and the mechanically moving parts thereof were easily subject to malfunction. Accordingly, a simple method of measuring the atmospheric pressure with no mechanical movements is required. A further requirement is an atmospheric pressure measurement device which has an additional function, because the automobiles call for increasingly compact design and lower weight.

SUMMARY OF THE INVENTION

It is therefore an object of the present invention to provide a method of controlling the exhaust gas recirculation for a Diesel engine without using any conventional atmospheric pressure sensor which operates mechanically, but by measuring and using parameters other than the atmospheric pressure.

It is another object of the present invention to provide a method of controlling the recirculation of exhaust gas for a Diesel engine in which the exhaust gas recirculation rate or amount is controlled in accordance with the burning flame light in the cylinder and also in accordance with the change in the atmospheric pressure, i.e. the altitude where the engine operates.

It is still another object of the present invention to provide a method of controlling the recirculation of exhaust gas for a Diesel engine in which the exhaust gas recirculation amount is accurately controlled in accordance with the mean value of the peak value of the burning flame light detected by a burning flame light sensor so as to adapt to the altitude where the engine is running, without mechanical movements of any mechanical elements.

It is further object of the present invention to provide an apparatus for controlling the recirculation of exhaust gas for a Diesel engine in which an electronic control unit having a microprocessor, ROM, and a RAM is utilized for accurately controlling the exhaust gas recirculation amount through data maps which have been stored in the ROM, in accordance with signals detected by various sensors, such as a flame sensor, an accelerator pedal opening sensor, an engine speed sensor, etc.

It is still further object of the present invention to provide an apparatus for controlling the recirculation of exhaust gas for a Diesel engine in which specific control programs for controlling the recirculation amount of the exhaust gas have been preliminarily stored in the ROM.

One feature according to the present invention resides in the method of controlling the exhaust gas recirculation for a Diesel engine which comprises the steps of: detecting the engine speed NE and an engine load LD; retrieving a basic recirculation amount of the exhaust gas $E_0$ from a map stored in a memory in accordance with the engine speed and the engine load; determining whether or not the opening of an accelerator pedal is in a predetermined state; determining whether or not a counter is above a predetermined count n in accordance with the result of said first determination; detecting the intensity of the burning flame light by a flame sensor and the peak value F (i) from the nth burning flame light and calculating the total $F_p$ of the peak values; calculating the mean values $\overline{F}_p = F_p/n$ and seeking a correction factor $K_e$ for the gas circulating amount $E_f (F_p)$ in accordance with the result of said second determination; seeking a final gas recirculation amount $E_f$ by the calculation of $E_f = E_0 \times K_e$ from the basic gas recirculation amount $E_0$ and the correction factor $K_e$; and calculating the duty of a control signal to be applied to a negative pressure control valve for controlling the exhaust gas recirculation amount in accordance with the function g $(E_f)$ as a result of the calculation.

Another feature according to the present invention resides in the apparatus for controlling the exhaust gas recirculation for a Diesel engine which comprises: an exhaust reflux pipe communicating between a suction manifold and an exhaust manifold and having an exhaust gas recirculation control valve; a fuel injection pump having a timer control valve for controlling the fuel injection timing of the fuel injection pump; a negative pressure control valve provided at between the exhaust gas recirculation control valve and a vacuum pump and for controlling the sectional area or an opening area of the recirculation control valve in accordance with the change in the negative air pressure from said negative pressure control valve; a plurality of sensors for detecting the engine speed, the engine load, the opening of an accelerator pedal, and the burning flame light etc. and; an electronic control unit comprising a CPU for receiving various data and signals from said sensors and for performing various operations ans calculation of these data and the detected signals, and for producing control singals to said exhaust gas recirculation control valve and to said timer control valve, etc. in accordance with control programs; a ROM for preliminarily storing various data maps such as recirculation rates determined between the engine speed NE and the engine load LD and the control programs for controlling the operation of said CPU; and a RAM for temporalily storing data corresponding to the detected signals by said sensors; thereby controlling said negative pressure control valve for controlling the exhaust gas recirculation amount and also for controlling said timer control valve for controlling the time position for performing the fuel injection, in accordance with the detected signals by said sensors, said data maps and said control programs.

These and other objects, features and advantages of the present invention will be better understood from the detailed description of the embodiments of the invention with reference to the attached drawings.

DESCRIPTION OF THE PREFERRED EMBODIMENT

Figure 1:
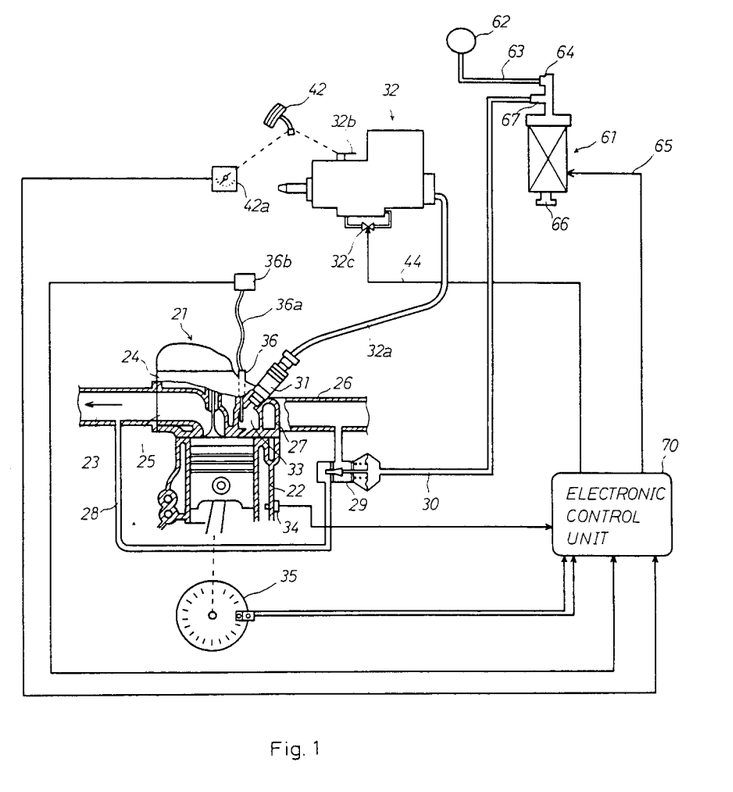
FIG. 1 is an overall engine system to which the present invention is applied.

Referring now to FIG. 1 which shows an example of Diesel engine of exhaust gas recirculation type (will be referred to as "EGR" hereinafter) and its associated peripheral units, the Diesel engine is generally indicated at 21. The reference numeral 22 indicates a cylinder, 23 indicates an exhaust manifold connected to the exhaust port 25 of cylinder head 24, and 26 denotes a suction manifold or intake manifold connected to a suction port 27 of the cylinder head 24.

There is disposed in the suction manifold 26 an exhaust reflux pipe 28 as an exhaust passage from the exhaust manifold 23. There is provided in the middle of this exhaust reflux pipe 28 a diaphragm type exhaust gas recirculation control valve 29 (will be referred to as "EGR" valve hereinafter) the sectional or opening area of which can be changed in accordance with the change in the negative pressure of air supplied from a pipe 30, thereby adjusting the recirculation amount of the echaust gas from the exhaust manifold 23 to the suction manifold 26.

The numeral 31 denotes a fuel injection valve mounted at the cylinder head 24 and which injects the fuel supplied from a fuel injection pump 32 via a high pressure pipe 32a for feeding the pressurized fuel into a sub chamber 33 of the Diesel engine 21. This sub chamber is a precombustion chamber, vortex chamber or air chamber. The reference numeral 34 is a water temperature sensor which detects the temperature of the engine cooling water and produces a signal indicative of the water temparature. Further, the numeral 35 denotes an engine speed sensor coupled with a crank shaft (not shown) of the Diesel engine 21 and which detects the engine speed and produces a signal indicative of the speed. This sensor also serves to detect a top dead center of cylinder which is a positional reference. The numeral 36 indicates a flame sensor disposed in the sub chamber 33 of the cylinder 22. This flame sensor 36 is so arranged as to detect the light from the burning flame of the fuel in the sub chamber 33 and transmit it via optical fiber 36a to a light detecting circuit 36b from which it will be delivered as an electric signal.

The reference numeral 42 denotes an accelerator pedal to which an acceleration lever 32b of the fuel injection pump 32 is coupled . As the acceleration lever 32b is rotated, the amount of fuel to be injected which corresponds to the rotated extent of the lever is supplied under pressure to the fuel injection valve 31 via the high pressure injection pipe 32a for feeding the pressurized fuel. The reference numeral 42a is an accelerator pedal depression or opening sensor interlocked with the accelerator pedal 42 and which produces an electric analog signal indicative of the accelerator pedal depression. The numeral 32c denotes a timer control valve for adjusting the fuel injection timing of the fuel injection pump 32 in which the opening area is controlled by a control signal 44.

The reference numeral 61 is an electromagnetic negative pressure control valve which introduces a negative pressure from a vacuum pump 62 via a pipe 63 and a negative pressure port 64 while introducing the air from an air suction pipe 66, thus adjusting the negative pressure and supplying the controlled negative pressure from a negative pressure control port 67 via the pipe 30 to the EGR valve 29.

The reference numeral 70 shows an electronic control unit which operates and calculates, as programmed , the signals from the TDC/engine speed sensor 35, flame sensor 36 and the accelerator pedal depression sensor 42a, in accordance with a control program and delivers a control signal 65 to an electromagnetic pressure control valve 32c and a control signal 44 to the timer control valve 32c.

Figure 2:
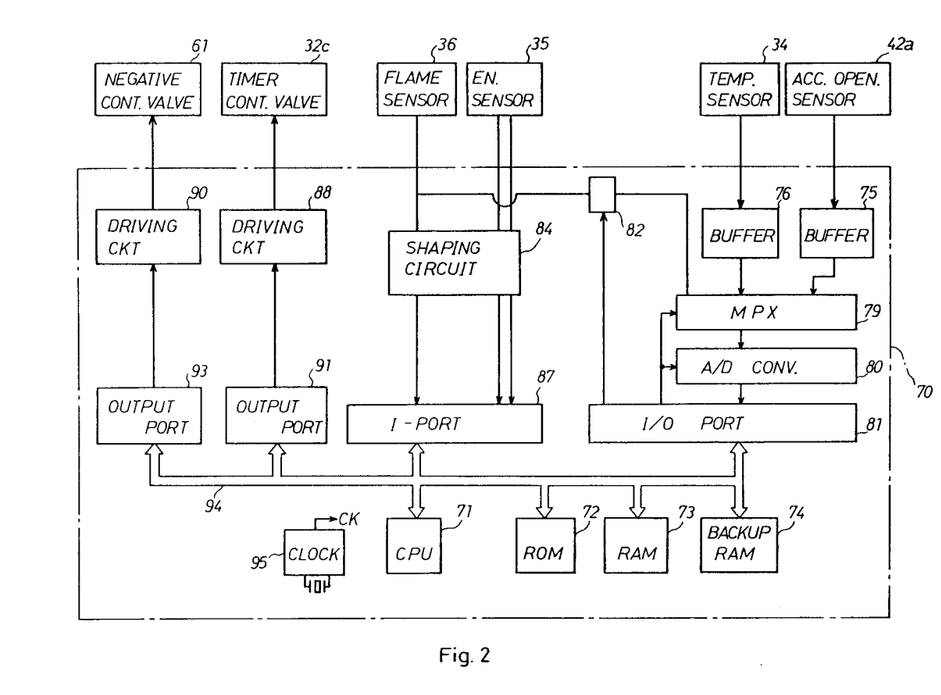
FIG. 2 is an detailed circuit diagram of the electronic control unit in FIG. 1.

FIG. 2 shows an example of the electronic control unit 70 and its associated components in the form of a block diagram.

The reference numeral 71 denotes a central processing unit (will be referred to simply as "CPU" hereinafter) which receives and calculates the data from various sensors according to a control program, and makes various operations and processing for controlling the operations of various units. The numeral 72 is read only memory ( will be referred to as "ROM" hereinafter) in which control program and initial data are stored, the reference numeral 73 is a random access memory ( will be referred to as "RAM" hereinafter) from and into which data for entry to the electronic control unit 70 and data necessary for calculation and control are temporarily read and written, the numeral 74 denotes a backup random access memory ( will be referred to as "backup RAM"), nonvolatile memory backed up by a battery to maintain, even when the key switch is turned off the data required for the subsequent operation of the engine, the numerals 75 and 76 denote buffers for output signals from the sensors, the numeral 79 is a multiplexer for selectively delivering the output signals from the sensors to CPU 71, the numeral 80 indicates an A/D converter to convert analogue signals into digital one, and the numeral 81 indicates an input/output port which sends to the CPU 71 the sensor output signals supplied via the buffers 75 and 76, multiplexer 79 and the A/D converter 80 and delivers a control signal from the CPU 71 to the multiplexer 79 and A/D converter 80. The reference numeral 82 indicates a peak hold circuit which holds the peak value of a signal from the flame sensor 36. This peak value is supplied via the mutiplexer 79 to the A/D converter 80 where it is analogue-digital converted and supplied as input to the input/output port 81, while the peak value is updated with a signal issued at each crank angle and the peak value is updated with a signal issued at each predetermined crank angle and supplied via the port 81 from the CPU 71. In case an integrated value of pulses is used in lieu of the peak value, an integrator is used for the peak hold circuit 82. The reference numeral 84 denotes a shaping circuit which shapes the waveform of output signals from the TDC/engine speed sensor 35 and flame sensor 36. The sensor output signals are directly fed to the CPU 71 from the shaping circuit via an input port 87.

Further, reference numerals 88 and 90 denote drive circuits, respectively, which drive the timer control valve 32c and electromagnetic negative pressure control valve 61, respectively, by signals supplied from the CPU 71 via output port 91, and 93 respectively. The numeral 94 is a bus line as a passage for signals and data, and the numeral 95 indicates a clock circuit which delivers clock signals, which time the control, to CPU 71, ROM 72 and RAM 73 at predetermined intervals.

Figure 3:
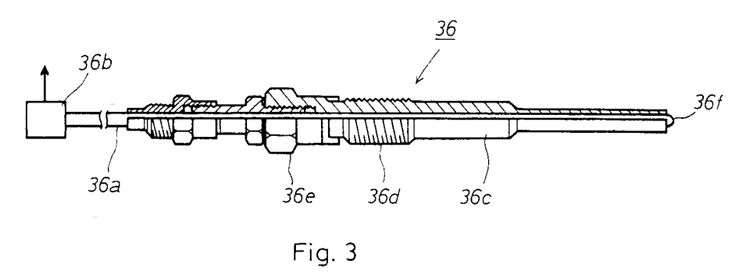
FIG. 3 is the construction of the flame sensor shown in FIG. 1, showing a partially sectional view thereof.

An example of the detailed structure of the flame sensor 36 is shown in FIG. 3. The numeral 36c is a cylindrical housing of which the outer circumferential face has a threading 36d and hexagonal head portion 36e for being screwed in the cylinder 22 of the engine. The cylindrical housing 36c has a central hole through which an optical fiber 36a made of quartz glass is penetrated. The end 36f of this optical fiber 36a is projected out of the cylindrical housing 36c and formed as a lens for easy detection of light, and the other end is provided with a light detecting converting circuit 36b which uses a phototransistor, photodiode or solar cell to detect the light from the burning flame of fuel and convert it into an electric signal.

Figure 4:
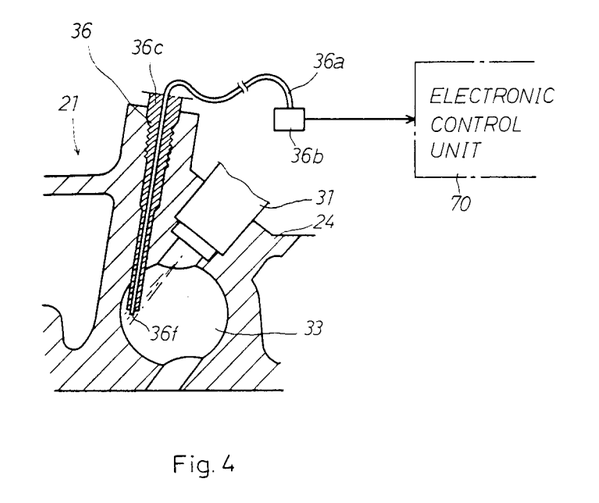
FIG. 4 is a partial sectional view of the engine and the flame sensor mounted thereat, shown in FIG. 1.

As shown in FIG. 4, the flame sensor 36 is mounted in such a manner that the end of 36f of the optical fiber 36a is exposed in the sub chamber 33 in the cylinder head 24 which is a portion of the cylinder 22 of the engine 21. After being led out of the cylinder head 24 through the cylindrical housing 36c, the optical fiber 36a is connected to the light detecting converting circuit 36b. The light from the burning flame in the sub chamber 33 reaches the light detecting converting circuit 36b via the optical fiber 36a where it is converted into an electric signal and delivered to the electronic control unit 70. The reference numeral 31 indicates a nozzle of the fuel injection valve 31, which is arranged in such a manner that the fuel injected from the nozzle nearly hits the end 36f of the optical fiber 36a. Because of this arrangement of the nozzle, the end 36f is washed by the fuel and so it is not easily stained.

The optical fiber in the cylindrical housing 36c and that to the light detecting converting circuit 36b may be separately laid. In this case , both these optical fibers should be integrally connected by welding, etc. at the time of assembling the flame sensor to the engine 21.

The control program of one embodiment of the present invention will be described below.

Figure 5:
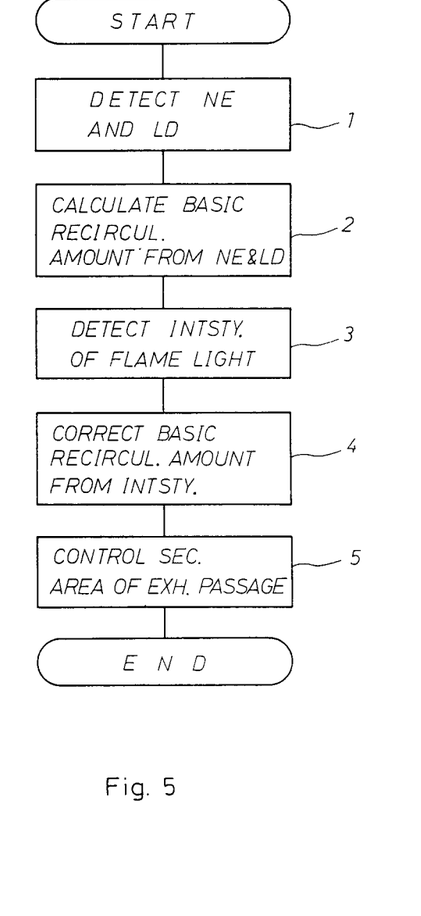
FIG. 5 is a basic construction of the method of controlling the recirculation of exhaust gas for a Diesel engine according to the present invention.

FIG. 5 shows the basic construction of the method of controlling the recirculation of exhaust gas according to the present invention. The method according to the present invention comprises the five principal steps as shown in which:

the reference numeral 1 shows a step where the engine speed and load are detected;

the numeral 2 shows a step where a basic circulation amount or rate is determined based on the engine speed and load detected at the step 1 above;

the numeral 3 denotes a step where the intensity of the burning flame light of fuel inside the engine cylinder is detected;

the reference numeral 4 shows a step where the basic recirculation amount of exhaust gas determined in the step 3 is corrected based on the intensity of the burning flame light detected at the step 3;

the numeral 5 shows a step where the sectional or opening area of the exhaust passage corresponding to the recirculation amount is controlled after the correction in the step 4.

Figure 6:
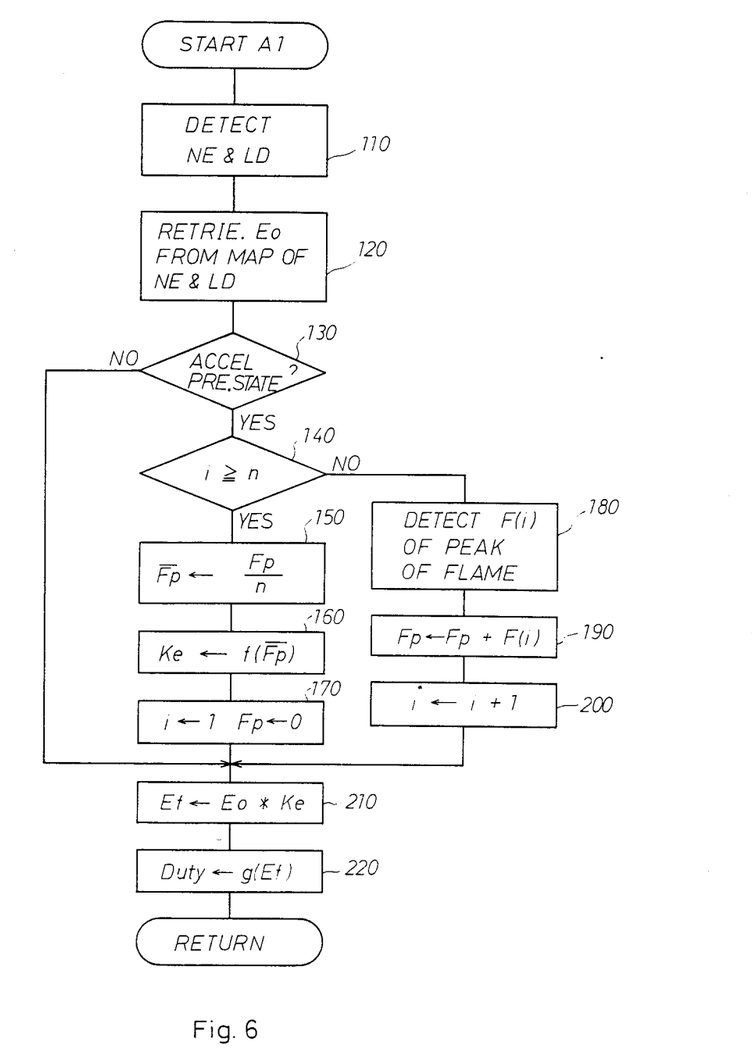
FIG. 6 is a detailed construction of the method of controlling the recirculation of exhaust gas for a Diesel engine according to the present invention shown in FIG. 5.

FIG. 6 shows a program flow chart of a subroutine A1 for realizing the method of a first embodiment according to the present invention.

The subroutine A1 shown here is part of the operations or processing effected by the electronic control unit 70, and it is executed at the lapse of a predetermined time or at a predetermined crank angle.

Figure 7:
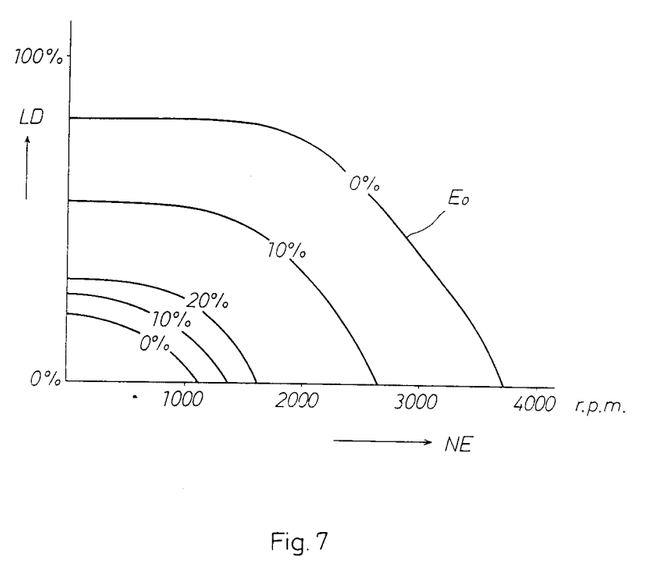
FIG. 7 is a map of a basic recirculation amount determined by the engine speed and the engine load, which has been stored in the ROM in FIG. 2.

In the figure, the reference numeral 110 indicates a step where the engine speed NE and engine load LD are detected.The engine speed is detected by the speed sensor 35, while the engine load LD is detected by the acceleration pedal depression sensor 42a. The numeral 120 denotes a step where the basic exhaust gas recirculation rate $E_0$ is retrieved from a map based on said NE and LD. This map corresponds to a contour graph shown in FIG. 7, and $E_0$ derived from the engine speed NE and the engine load LD is given as the exhaust gas recirculation rate or factor (%) or the ratio of exhaust gas supplied into suction air. The reference numeral 130 is a step where a decision or determination is made if the opening or depression of the accelerator pedal detected at the the step 110 is in a predetermined state or not. The typical state as said predetermined state, for example, is the idling state or the full-throttle state when the accelerator pedal is fully depressed. The numeral 140 indicates a step where a decision is made if the counter i counts a value over a predetermined count n or not. The numeral 150 is a step where the total of the peak values of light intensity from the burning flame detected by the flame sensor n times is divided by n to calculate a mean value $F_p$ of the peak values.

Figure 8:
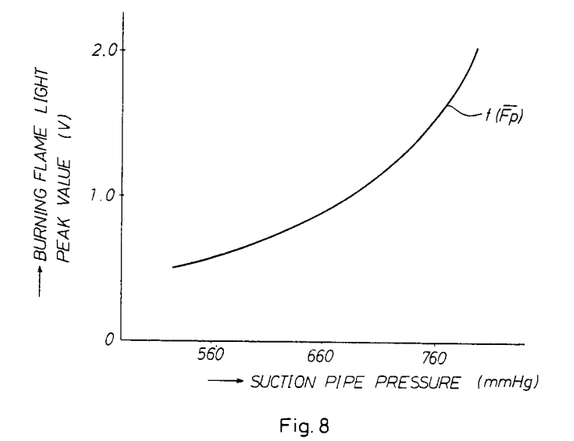
FIG. 8 is a graph showing the relationship between the peak value of the burning flame light and the suction pipe.
Figure 9:
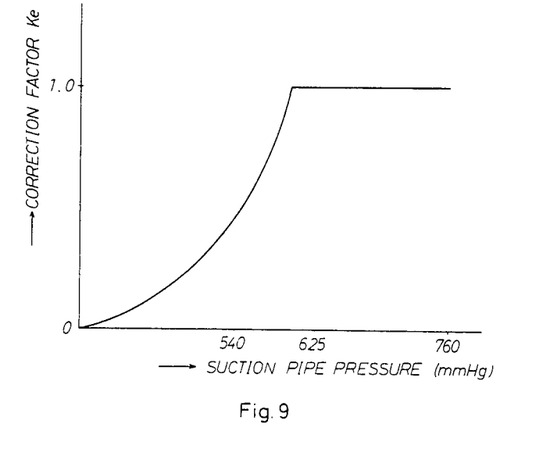
FIG. 9 is a characteristic graph showing the relationship between the suction pipe pressure and correction factor $K_{e'}$ and FIG. 10 is a program flow chart for controlling the fuel injection timing by the control of the timer control valve shown in FIG. 1.

The numeral 160 is a step in which a function $f(F_p)$ is calculated based on said $F_p$ valve to determine a exhaust gas recirculation rate correction factor $K_e$. The function $f(F_p)$ is as shown in FIG. 8 which shows a graph of pressure in the suction pipe vs. peak value of the bruning-flame light, and in FIG. 9 which shows a graph of pressure in the suction pipe vs. correction factor $K_e$. Also, the $K_e$ value may be determined from the maps in FIG. 8 and 9. Since the pressure in the suction pipe is nearly the same as the atmospheric pressure, the pressure in the suction pipe is taken as a parameter in place of the suction pipe pressure in this engine. The numeral 170 indicates a step where "1" is set in the counter i to clear the total peak value $F_p$. The numeral 180 is a step where the peak value of the ith burning-flame light is detected as F(i) by the flame sensor 36. This F(i) may be an integrated value of the burning-flame light, and not limited to the peak value. The numeral 190 indicates a step in which peak values are added together to determine or seek a total value $F_p$. The reference numeral 200 is a step where the counter i is incremented. The numeral 210 is a step where the basic exhaust gas recirculation rate $E_0$ sought in the step 120 is multiplied by the correction factor $K_e$ sought in the step 160 to seek a final exhaust gas recirculation rate $E_f$. The step 220 indicates a step where a function g ($E_f$) is calculated based on $E_f$ in the step 210 to calculate the duty cycle of the control signal for the electromagnetic negative pressure control valve 61.

When the processing of the subroutine A1 is started in the above arrangement, the step 110 is executed and the engine speed NE and the engine load LD are detected. Next, in the step 120, the basic exhaust gas recirculation rate $E_0$ is retrieved from a map based on said NE and LD. Then, the step 130 is executed and a decision is made if the opening of the accelerator pedal is in a predetermined state or condition or not. If the result of the decision is "YES", the next step 140 is executed. In this step 140, a decision is made whether or not the value of the counter i is above a predetermined value n. However, since the processing has been just started and the main routine (not shown) has been initially set to "1", the count i is less than the predetermined value n. Accordingly, the result of the decision becomes "NO" and the operation now moves to the next step 180, and the step 180 is executed. In the step 180, the peak value of burning-flame light in the cylinder 22 is detected by the flame sensor 36, and the operation now moves to the next step 190, where the above peak value is added to F. In the initialization of the main routine (not shown) the value $F_p$ is in the cleared state. Further in the step 200, the counter i is incremented.

In the step 210, the basic exhaust gas recirculation rate $E_0$ calculated in the step 120 is multiplied by a correction factor $K_e$ to provide the final exhaust gas recirculation rate $E_f$. Since the step 160 has not yet been executed, the value set in the initialization of the main routine is used as the correction factor $K_e$. Next, in the step 220, the duty cycle of a control signal for controlling the electromagnetic negative pressure control valve 61 is calculated by the function g ($E_f$) in accordance with the value $E_f$ determined in the step 210 and the operation of the subroutine A1 terminates.

As the subroutine A1 is started again, the steps 110 and 120 are executed and the operation now moves to the next step 130. In the step 130, a decision is made if the opening of the accelerator pedal is still constant or the predetermined state, the determination becomes "YES" in the step 130. In the next step 140, it is determined whether or not the value of the counter i is above n. Since the count in the counter i has been incremented to "2" in the previous operation, and if the value n is, for example, "100", the result of decision becomes "NO" and the step 180 is executed to detect the peak of the burning-flame light value thus selected is added to $F_p$ in the step 190, and the operation now moves to the step 220, where the duty cycle is determined in the step.

In the next step 190, the peak value thus calculated is added to $F_p$ in the step 190, and the opening now moves to the step 200, where the counter i is incremented. Namely, the count is counted up to "3". After step 210, the operation moves to the step 220, where the duty cycle is determined in the step. Then, the processing of the subroutine A1 terminates. So long as the accelerator pedal depression or opening remains in the predetermined state and the value of i is less than n, the result of the decision in the step 140 becomes "NO" and the detection of peak value of the burning-flame light, addition of the peak value to $F_p$ and increment of the counter i will be repeatedly done.

When the value of the counter i becomes above n after the repetition of such processings, a decision of "YES" is made in the step 140 of the subroutine A1 and then the step 150 is executed. Here, the value $F_p$ previously calculated in the step 190 is divided by n to calculate a mean value $F_p$ of the peak value of the burning-flame light. Next, in the step 160, the function f ($F_p$) is calculated based in $F_p$ to determine the correction factor $K_e$. Then, in the step 170, "1" is set in the counter i and the total value $F_p$ of the peak value is cleared. When the step 210 is executed, the basic exhaust gas recirculation rate $E_0$ calculated in the step 120 is multiplied by the correction factor $K_e$ obtained in the step 160 to seek the final exhaust gas recirculation rate $E_f$. Subsequently, in the step 220, the duty cycle is calcuteed based on this $E_f$, and the processing of this subroutine A1 is ended.

On the other hand, in case the accelerator pedal depression or opening is being changed, a decision of "NO" is made in the step 130 of this subroutine A1 so that the peak of the burning-flame light is not detected by the flame sensor 36. In the step 120, the final exhaust gas recirculation rate $E_f$ is determined based on the correcting factor $K_e$ initially set previously calculated in the step 160, and in the step 220, the duty is calculated based on the $E_f$ value. Such processing or operations will be repeated.

With the construction of the embodiment according to the present invention, it is possible to control the exhaust gas recirculation rate in accordance with the burning-flame light in the cylinder 22 and also in accordance with the change in the air pressure. Since the peak or integrated value of the burning-flame light value has a correlation with the atmospheric pressure, that is the pressure in the suction pipe in this case, the exhaust gas recirculation rate can be controlled according to the atmospheric pressure, namely, the altitude where the engine works.

Furthermore, the calculation of a correction factor for the exhaust gas recirculation rate based on the mean value of peak values of the burning-flame light makes it possible to accurately control the exhaust gas recirculation.

According to the second embodiment of the present invention, the subroutine A1 in the first embodiment may be utilized in combination with the method of controlling the fuel injection timing utilizing data of timing when the burning-flame light is detected by the flame sensor 36.

Figure 10:
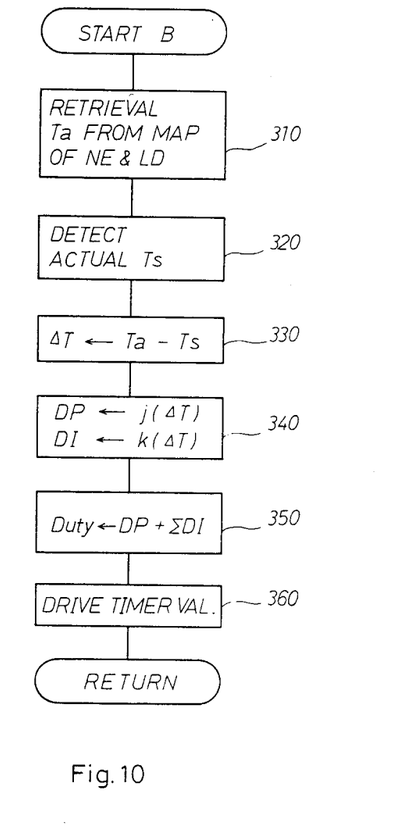

FIG. 10 shows as another subroutine B of a program flow chart of the fuel injection control in combination with the first embodiment. In the figure, the numeral 310 is a step where a present ignition timing $T_a$ is retrieved from the map based on the NE and LD calculated in the step 110 of the subroutine A1. The reference numeral 320 indicates a step, where the actual ignition timing $T_s$ from the top dead center of the cylinder until the ignition is read in. The numeral 330 is a step where the $T_s$ value is subtracted from the value $T_a$ to calculate the difference $\Delta T$. The numeral 340 is a step where a function $j(\Delta T)$ is calculated based on the value $\Delta T$, thereby setting a proportional term DP of the feedback control and further calculating an integration term DI of the feedback control by calculating a function K ($\Delta T$) based on the value $\Delta T$. The numeral 350 indicates a step where the value DT is added to the integrated value $\Sigma$ DI to calculate the duty cycle of the control signal for the timer control valve 32c. Finally, the numeral 360 indicates a step where the timer control valve 32c is driven based on the duty cycle to drive the timer to a position for a predetermined fuel injection timing.

With the above-mentioned construction of this second embodiment the exhaust gas recirculation amount can be controlled by calculating the atmospheric pressure from a peak value or integrated value of the burning-flame light detected by the flame sensor as in the first embodiment, while enabling the fuel injection timing to be feedback-controlled by measuring the time when a signal based on the burning-flame light is produced from the flame sensor 36 according to the subroutine B.

In the manner as described, both the atmospheric pressure and ignition timing can be detected by one sensor, thereby enabling the control unit and the operation thereof to be simplified, as well as the weight of the unit to be reduced.

As having been described in the foregoing, according to the present invention, the method of controlling the exhaust gas recirculation for a Diesel engine and controlling the recirculation amount of the exhaust gas to the cylinders, by adjusting the sectional area of an exhaust passage connected between the exhaust and suction side of the engine based on the engine speed and load is characterized in that it comprises the steps of detecting the engine speed NE and engine load LD; retrieving a basic recirculation amount of the exhaust gas $E_0$ from a map stored in a memory in accordance with said engine speed and the engine load; determining whether or not the opening of an accelerator pedal is in a predetermined state; determining whether or not a counter is above a predetermined count n in accordance with the result of said first determination; detecting the intensity of the burning flame light by a flame sensor and the peak value F(i) from the nth burning flame light and calculating the total $F_p$ of the peak values; calculating the mean values $\overline{F}_p = F_p/n$ and seeking a correction factor $K_e$ for the gas recirculation amount $E_f$ ($F_p$) in accordance with the result of said second determination; seeking a final gas recirculation amount $E_f$ by the calculation of $E_f = E_0 \times K_e$ from the basic gas recirculation amount $E_0$ and the correction factor $K_e$; and calculating the duty of a control signal to be applied to a negative pressure control valve for controlling the exhaust gas recirculation amount in accordance with the function g ($E_f$) as the result of the calculation.

Accordingly, the exhaust gas recirculation amount can be precisely controlled so as to adapt to the altitude of any place where the engine is running without any mechanical actions by picking up the intensity of the burning flame light, etc..

Moreover, as a secondary effect of the method according to the present invention, data such as burning flame light can be detected as data for controlling the ignition timing so that another system may be commonly used for this purpose.

Moreover, according to the present invention, the apparatus for controlling the recirculation of exhaust gas for a Diesel engine is characterized in that it comprises: an exhaust reflux pipe communicating between a intake manifold and an exhaust manifold having an exhaust gas recirculation control valve; a fuel injection pump having a timer control valve for controlling the fuel injection timing of the fuel injection pump; a negative pressure control valve provided at between the exhaust gas recirculation control valve and a vacuum pump and for controlling the sectional area or an opening area of the recirculation control valve in accordance with the change in the negative air pressure from said negative pressure control valve; a plurality of sensors for detecting the engine speed, the engine load, the opening of an accelerator pedal, and the burning flame light, etc. and; an electronic control unit comprising a CPU for receiving various data and signals from said sensors and for performing various operations and calculation of these data and signal and for producing control signals to said exhaust gas recirculation control valve and to said timer control valve, etc. in accordance with control program. The apparatus also comprises a ROM for preliminarily storing various data maps such as recirculation rates determined between the engine speed NE and the engine load LD and the control programs for controlling the operations of said CPU; and a RAM for temporarily storing data corresponding to the detected signals by said sensors, thereby controlling said negative pressure control valve for controlling the exhaust gas recirculation amount and also for controlling said timer control valve for controlling the time position for performing the fuel injection, in accordance with the detected signals by said sensors, said data maps and said control programs, whereby the recirculation amount of the exhaust gas can be accurately controlled through the CPU in accordance with the data, the data maps, and the control programs which have been all stored in the ROM and also in accordance with the detected signals by the various sensors.

Accordingly, the method and apparatus for controlling the recirculation of exhaust gas according to the present invention contributes significantly to the simplification and the light-weight design of the electronic central unit.

While the invention has been described in its preferred embodiments, it is to be understood that the words which have been used are words of description rather than of limitation and that various changes and modification may be made within the purview of the appended claims without department from the true scope and the spirit of the invention in its broader aspects.

What is claimed is:

1. A system for controlling exhaust gas recirculation for a diesel engine having a recirculation path, said system comprising:

first signal generating means for generating a speed signal indicative of the current engine speed;

second signal generating means for generating a load signal indicative of the current engine load;

means for deriving a basic exhaust gas recirculation value as a function of said speed signal and said load signal;

third signal generating means for generating a peak value signal representative of the peak value of intensity of flame light in a combustion chamber;

fourth signal generating means for generating an exhaust gas recirculation control signal as a function of said basic exhaust gas recirculation value and of a correction factor representative of said peak values signal; and means responsive to said exhaust gas recirculation control signal for setting the amount of exhaust gas recirculation for said diesel engine.

2. A system as claimed in claim 1 wherein said deriving means comprises means for storing a table of basic exhaust gas recirculation values and for retrieving said stored values in response to said speed signal and said load signal.

3. A system as claimed in claim 1 further comprising:

means for storing a table of ignition timing values and for retrieving a target ignition timing value from said table as a function of current engine speed and current engine load;

means for detecting the actual ignition timing value;

means for calculating a difference between said target ignition timing and said actual ignition timing values;

means for calculating both the value of the term of proportional control and the value of the term of integral control of a feed back control relationship for ignition timing as functions of said difference; and means for calculating a fuel duty cycle ratio in accordance with said relationship and for driving a control valve of a fuel injection pump in accordance with said fuel duty cycle ratio.

4. A system as claimed in claim 1, wherein said third signal generating means comprises:

a counter;

comparator means for determining whether the current valve of said counter is greater than a predetermined value;

summing means for accumulating values of said peak value signal to compute a sum of peak values and for incrementing said counter when said counter is less than said predetermined value; and processing means for obtaining a mean peak value of flame intensity by dividing the total sum of said peak value signal value by said predetermined value, for calculating an updated value of said correction factor from said mean peak value, and for resetting said counter and said sum of peak values when the current value of said counter is greater than said predetermined value.

5. A system as recited in claim 4, wherein said fourth signal generating means comprises:

means for detecting whether an accelerator pedal is in a predetermined position;

means for setting said correction factor equal to said updated correction factor when said accelerator pedal is in said predetermined position, and for maintaining said correction factor equal to the present value of said correction factor when said accelerator pedal is not in said predetermined position; and means for multiplying said correction factor by said basic exhaust gas recirculation value and for calculating said exhaust gas recirculation control signal as a duty cycle ratio corresponding to the product of said correction factor and said basic exhaust gas recirculation value;

said means responsive to said exhaust gas recirculation control signal comprising a control valve disposed in the recirculation path and means for controlling the negative pressure applied to said control valve in accordance with said duty cycle ratio.

* * * * *